(12) United States Patent
Wilczynski et al.

(10) Patent No.: US 10,915,555 B2
(45) Date of Patent: Feb. 9, 2021

(54) SYSTEMS AND METHODS FOR ADAPTIVE DATA REPLICATION

(71) Applicant: Palantir Technologies Inc., Palo Alto, CA (US)

(72) Inventors: Peter Wilczynski, San Francisco, CA (US); Ryan Zheng, Mountain View, CA (US); John Carrino, Menlo Park, CA (US); Timothy Wilson, Palo Alto, CA (US); Stephen Freiberg, Palo Alto, CA (US); John Garrod, San Mateo, CA (US); William Waldrep, Palo Alto, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 247 days.

(21) Appl. No.: 16/116,037

(22) Filed: Aug. 29, 2018

(65) Prior Publication Data

US 2019/0012359 A1 Jan. 10, 2019

Related U.S. Application Data

(63) Continuation of application No. 15/664,184, filed on Jul. 31, 2017, now Pat. No. 10,068,002.

(Continued)

(51) Int. Cl.
*G06F 7/00* (2006.01)
*G06F 16/27* (2019.01)
(Continued)

(52) U.S. Cl.
CPC ............ *G06F 16/275* (2019.01); *G06F 16/27* (2019.01); *G06F 16/29* (2019.01); *G06F 16/951* (2019.01)

(58) Field of Classification Search
CPC ...... G06F 16/275; G06F 16/27; G06F 16/951; G06F 16/29
(Continued)

(56) References Cited

U.S. PATENT DOCUMENTS

| | | |
|---|---|---|
| 5,548,749 A | 8/1996 | Kroenke et al. |
| 5,708,828 A | 1/1998 | Coleman |

(Continued)

FOREIGN PATENT DOCUMENTS

| | | |
|---|---|---|
| AU | 2011279270 | 9/2015 |
| EP | 0 816 968 | 1/1996 |

(Continued)

OTHER PUBLICATIONS

Dell Latitude D600 2003, Dell Inc., http://www.dell.com/downloads/global/products/latit/en/spec_latit_d600_en.pdf.

(Continued)

*Primary Examiner* — Isaac M Woo
(74) *Attorney, Agent, or Firm* — Sheppard Mullin Richter & Hampton LLP

(57) ABSTRACT

Systems and methods are provided for adaptive data replication. A first data object is stored. One or more first network characteristics of a communication network are detected. A first replication mode is triggered (e.g., a single-master replication mode) based on the one or more first network characteristics of the communication network. The single-master replication may be configured to facilitate real-time synchronizations (e.g., for critical updates). One or more second network characteristics of the communication network are detected. A second replication mode (e.g., a multi-master replication mode) is triggered based on the one or more second network characteristics. The second replication may be configured to facilitate a delayed synchroni- (Continued)

zation (e.g., for non-critical updates) of the first data object and the second data object using the second update file.

17 Claims, 8 Drawing Sheets

Related U.S. Application Data

(60) Provisional application No. 62/489,737, filed on Apr. 25, 2017.

(51) Int. Cl.
    *G06F 16/951*     (2019.01)
    *G06F 16/29*     (2019.01)

(58) Field of Classification Search
    USPC .............................................. 707/600–899
    See application file for complete search history.

(56) References Cited

U.S. PATENT DOCUMENTS

| | | |
|---|---|---|
| 5,765,171 A | 6/1998 | Gehani et al. |
| 5,870,761 A | 2/1999 | Demers et al. |
| 5,995,980 A | 11/1999 | Olson et al. |
| 6,098,078 A | 8/2000 | Gehani et al. |
| 6,190,053 B1 | 2/2001 | Stahlecker et al. |
| 6,202,085 B1 | 3/2001 | Benson et al. |
| 6,216,140 B1 | 4/2001 | Kramer |
| 6,240,414 B1 | 5/2001 | Beizer et al. |
| 6,317,754 B1 | 11/2001 | Peng |
| 6,374,252 B1 | 4/2002 | Althoff et al. |
| 6,539,381 B1 | 3/2003 | Prasad et al. |
| 6,560,620 B1 | 5/2003 | Ching |
| 6,816,941 B1 | 11/2004 | Carlson et al. |
| 7,072,911 B1 | 7/2006 | Doman |
| 7,167,877 B2 | 1/2007 | Balogh et al. |
| 7,437,664 B2 | 10/2008 | Borson |
| 7,519,573 B2 | 4/2009 | Helfman et al. |
| 7,596,285 B2 | 9/2009 | Brown et al. |
| 7,676,788 B1 | 3/2010 | Ousterhout et al. |
| 7,730,396 B2 | 6/2010 | Chidlovskii et al. |
| 7,818,297 B2 | 10/2010 | Peleg et al. |
| 7,877,421 B2 | 1/2011 | Berger et al. |
| 7,962,495 B2 | 6/2011 | Jain et al. |
| 8,015,151 B2 | 9/2011 | Lier et al. |
| 8,290,990 B2 | 10/2012 | Drath et al. |
| 8,301,904 B1 | 10/2012 | Gryaznov |
| 8,312,546 B2 | 11/2012 | Alme |
| 8,316,060 B1 | 11/2012 | Snyder et al. |
| 8,341,115 B1 | 12/2012 | Natanzon et al. |
| 8,380,659 B2 | 2/2013 | Zunger |
| 8,442,940 B1 | 5/2013 | Faletti et al. |
| 8,515,912 B2 | 8/2013 | Garrod et al. |
| 8,527,461 B2 | 9/2013 | Ducott, III et al. |
| 8,646,080 B2 | 2/2014 | Williamson et al. |
| 8,688,749 B1 | 4/2014 | Ducott, III et al. |
| 8,726,379 B1 | 5/2014 | Stiansen et al. |
| 8,782,004 B2 | 7/2014 | Ducott, III et al. |
| 8,838,538 B1 | 9/2014 | Landau et al. |
| 8,886,601 B1 | 11/2014 | Landau et al. |
| 9,009,827 B1 | 4/2015 | Albertson et al. |
| 9,275,069 B1 | 3/2016 | Garrod et al. |
| 9,330,157 B2 | 5/2016 | Ducott, III et al. |
| 10,068,002 B1 | 9/2018 | Wilczynski et al. |
| 2003/0084017 A1 | 5/2003 | Ordille |
| 2003/0088654 A1 | 5/2003 | Good et al. |
| 2003/0182313 A1 | 9/2003 | Federwisch et al. |
| 2004/0103124 A1 | 5/2004 | Kupkova |
| 2004/0111390 A1 | 6/2004 | Saito et al. |
| 2004/0148317 A1* | 7/2004 | Sundararajan ........ G06F 16/275 |
| 2004/0250576 A1 | 12/2004 | Flanders |
| 2005/0034107 A1 | 2/2005 | Kendall et al. |
| 2005/0108063 A1 | 5/2005 | Madill et al. |
| 2005/0193024 A1 | 9/2005 | Beyer et al. |
| 2006/0036568 A1 | 2/2006 | Moore et al. |
| 2006/0106879 A1 | 5/2006 | Zondervan et al. |
| 2006/0155945 A1 | 7/2006 | McGarvey |
| 2006/0190497 A1 | 8/2006 | Inturi et al. |
| 2006/0206866 A1 | 9/2006 | Eldrige et al. |
| 2006/0218637 A1 | 9/2006 | Thomas et al. |
| 2006/0224579 A1 | 10/2006 | Zheng |
| 2007/0005707 A1 | 1/2007 | Teodosiu et al. |
| 2007/0026373 A1 | 2/2007 | Suriyanarayanan et al. |
| 2007/0112887 A1 | 5/2007 | Liu et al. |
| 2007/0168516 A1 | 7/2007 | Liu et al. |
| 2007/0180075 A1 | 8/2007 | Chasman et al. |
| 2007/0220067 A1 | 9/2007 | Suriyanarayanan et al. |
| 2007/0220328 A1 | 9/2007 | Liu et al. |
| 2007/0233756 A1 | 10/2007 | D'Souza et al. |
| 2007/0299887 A1 | 12/2007 | Novik et al. |
| 2008/0027981 A1 | 1/2008 | Wahl |
| 2008/0033753 A1 | 2/2008 | Canda et al. |
| 2008/0086718 A1 | 4/2008 | Bostick et al. |
| 2008/0141117 A1 | 6/2008 | King et al. |
| 2008/0148398 A1 | 6/2008 | Mezack et al. |
| 2008/0189240 A1 | 8/2008 | Mullins et al. |
| 2008/0235575 A1 | 9/2008 | Weiss |
| 2008/0243951 A1 | 10/2008 | Webman et al. |
| 2008/0320299 A1 | 12/2008 | Wobber et al. |
| 2009/0172821 A1 | 7/2009 | Daira et al. |
| 2009/0199090 A1 | 8/2009 | Poston et al. |
| 2009/0254970 A1 | 10/2009 | Agarwal et al. |
| 2010/0070842 A1 | 3/2010 | Aymeloglu et al. |
| 2010/0100963 A1 | 4/2010 | Mahaffey |
| 2010/0145909 A1 | 6/2010 | Ngo |
| 2010/0191884 A1 | 7/2010 | Holsenstein et al. |
| 2010/0330801 A1 | 12/2010 | Rouh |
| 2011/0010342 A1 | 1/2011 | Chen et al. |
| 2011/0219450 A1 | 9/2011 | McDougal et al. |
| 2011/0246229 A1 | 10/2011 | Pacha |
| 2011/0252339 A1 | 10/2011 | Lemonik et al. |
| 2012/0005159 A1 | 1/2012 | Wang et al. |
| 2012/0016849 A1 | 1/2012 | Garrod et al. |
| 2012/0023075 A1 | 1/2012 | Pulfer et al. |
| 2012/0036106 A1 | 2/2012 | Desai et al. |
| 2012/0159385 A1 | 6/2012 | Duncan et al. |
| 2012/0254129 A1 | 10/2012 | Wheeler et al. |
| 2013/0006655 A1 | 1/2013 | Van Arkel et al. |
| 2013/0006668 A1 | 1/2013 | Van Arkel et al. |
| 2013/0067017 A1 | 3/2013 | Carriere et al. |
| 2013/0173540 A1 | 7/2013 | Qian et al. |
| 2013/0191336 A1 | 7/2013 | Ducott et al. |
| 2013/0191338 A1 | 7/2013 | Ducott, III et al. |
| 2013/0276799 A1 | 10/2013 | Davidson |
| 2013/0346444 A1 | 12/2013 | Makkar et al. |
| 2014/0011000 A1 | 1/2014 | Dunkmann et al. |
| 2014/0040182 A1 | 2/2014 | Gilder et al. |
| 2014/0040714 A1 | 2/2014 | Siegel et al. |
| 2014/0081652 A1 | 3/2014 | Klindworth |
| 2014/0114972 A1 | 4/2014 | Ducott et al. |
| 2014/0129518 A1 | 5/2014 | Ducott et al. |
| 2014/0149130 A1 | 5/2014 | Getchius |
| 2014/0172793 A1 | 6/2014 | Stritzel et al. |
| 2014/0281889 A1 | 9/2014 | Treibach-Heck |
| 2015/0074050 A1 | 3/2015 | Landau et al. |
| 2015/0235334 A1 | 8/2015 | Wang et al. |
| 2015/0261847 A1 | 9/2015 | Ducott et al. |
| 2015/0379107 A1 | 12/2015 | Rank et al. |
| 2016/0019252 A1 | 1/2016 | Ducott et al. |

FOREIGN PATENT DOCUMENTS

| | | |
|---|---|---|
| EP | 1647908 | 4/2006 |
| EP | 2618279 | 7/2013 |
| EP | 2911078 | 8/2015 |
| NL | 2011642 | 8/2015 |
| WO | WO 2008/113059 | 9/2008 |

(56) References Cited

FOREIGN PATENT DOCUMENTS

WO     WO 2011/161565     12/2011
WO     WO 2012/009397     1/2012

OTHER PUBLICATIONS

Dou et al., "Ontology Translaation on the Semantic Web 2005," Springer-Verlag, Journal on Data Semantics II Lecture Notes in Computer Science, vol. 3350, pp. 35-37.
Fidge, Colin J., "Timestamps in Message-Passing Systems," K. Raymond (Ed.) Proc. of the 11th Australian Computer Science Conference (ACSC 1988), pp. 56-66.
Holliday, JoAnne, "Replicated Database Recovery using Multicast Communication," IEEE 2002, pp. 11.
Lamport, "Time, Clocks and the Ordering of Events in a Distributed System," Communications of the ACM, Jul. 1978, vol. 21, No. 7, pp. 558-565.
Loeliger, Jon, "Version Control with Git," O'Reilly, May 2009, pp. 330.
Mattern, F., "Virtual Time and Global States of Distributed Systems," Cosnard, M., Proc. Workshop on Parallel and Distributed Algorithms, Chateau de Bonas, France:Elsevier, 1989, pp. 215-226.
Notice of Allowance for U.S. Appl. No. 13/657,684 dated Mar. 2, 2015.
Notice of Allowance for U.S. Appl. No. 14/156,208 dated Feb. 12, 2016.
Notice of Allowance for U.S. Appl. No. 14/286,485 dated Jul. 29, 2015.
Notice of Allowance for U.S. Appl. No. 14/334,232 dated Nov. 10, 2015.
Notice of Allowance for U.S. Appl. No. 14/473,860 dated Jan. 5, 2015.
Official Communication for Canadian Patent Application No. 2806954 dated Jan. 15, 2016.
Official Communication for European Patent Application No. 14159175.0 dated Feb. 4, 2016.
Official Communication for European Patent Application No. 15155845.9 dated Oct. 6, 2015.
Official Communication for European Patent Application No. 15156004.2 dated Aug. 24, 2015.
Official Communication for U.S. Appl. No. 13/657,684 dated Aug. 28, 2014.
Official Communication for U.S. Appl. No. 14/076,385 dated Jan. 22, 2015.
Official Communication for U.S. Appl. No. 14/076,385 dated Jun. 2, 2015.
Official Communication for U.S. Appl. No. 14/076,385 dated Jan. 25, 2016.
Official Communication for U.S. Appl. No. 14/156,208 dated Mar. 9, 2015.
Official Communication for U.S. Appl. No. 14/156,208 dated Aug. 11, 2015.
Official Communication for U.S. Appl. No. 14/156,208 dated Sep. 17, 2015.
Official Communication for U.S. Appl. No. 14/286,485 dated Mar. 12, 2015.
Official Communication for U.S. Appl. No. 14/286,485 dated Apr. 30, 2015.
Official Communication for U.S. Appl. No. 14/334,232 dated Jul. 10, 2015.
Official Communication for U.S. Appl. No. 14/518,757 dated Apr. 2, 2015.
Official Communication for U.S. Appl. No. 14/518,757 dated Jul. 20, 2015.
Official Communication for U.S. Appl. No. 14/518,757 dated Dec. 1, 2015.
O'Sullivan, Bryan, "Making Sense of Revision Control Systems," Communications of the ACM, Sep. 2009, vol. 52, No. 9, pp. 57-62.
OWL Web Ontology Language Reference Feb. 2004, W3C, http://www.w3.org/TR/owl-ref/.
Parker, Jr. et al., "Detection of Mutual Inconsistency in Distributed Systems," IEEE Transactions in Software Engineering, May 1983, vol. SE-9, No. 3, pp. 241-247.
Symantec Corporation, "E-Security Begins with Sound Security Policies," Announcement Symantec, Jun. 14, 2001.
Official Communication for European Patent Application No. 18169365.6 dated Jun. 18, 2018.
Official Communication for U.S. Appl. No. 15/664,184 dated Apr. 20, 2018.
Official Communication for U.S. Appl. No. 15/835,847 dated Mar. 28, 2018.
Official Communication for U.S. Appl. No. 15/835,847 dated Aug. 31, 2018.
Anonymous, "Multi-master replication—Wikipedia", Jul. 27, 2017, retrieved from the Internet: https://web/archive.org/web/20170727141057/https://en.wikipedia.org/wiki/Multi-master_replication#Disadvantages.
Summons to Attend Oral Proceedings pursuant to Rule 115(1) EPC for EP Application No. 18169365.6 dated Jul. 16, 2020, 22 pages.

\* cited by examiner

SYSTEMS AND METHODS FOR ADAPTIVE DATA REPLICATION

CROSS REFERENCE TO RELATED APPLICATIONS

This application is a continuation of U.S. patent application Ser. No. 15/664,184, filed Jul. 31, 2017, which claims the benefit under 35 U.S.C. § 119(e) of the U.S. Provisional Application Ser. No. 62/489,737, filed Apr. 25, 2017, the content of which is hereby incorporated by reference in its entirety.

BACKGROUND

Technical Field

This disclosure relates to approaches for data replication and data synchronization.

Description of Related Art

Under conventional approaches, data synchronization may involve transmitting data from a first system to a second system over a network. For example, data may be pushed or pulled from the first system to update corresponding data on the second system. However, typical data synchronization schemes do not account for changes in network performance characteristics. For example, highly-fault tolerant data synchronization schemes may fail to take advantage of strong network connections and may become a bottleneck in various situations (e.g., multi-user collaboration), while low-fault tolerant data synchronization schemes may not function when operated over an unreliable network.

SUMMARY

A claimed solution rooted in computer technology overcomes problems specifically arising in the realm of computer technology. In various implementations, a computing system is configured to provide methods and systems that facilitate adaptive data replication and/or synchronization. For example, different data replications modes may be selected based on network performance characteristics (e.g., latency, bandwidth, throughput, connected or disconnected network status, and the like.). In some embodiments, a first replication mode (e.g., a single-master replication mode) is selected when a sufficiently strong network connection is available (e.g., latency below a particular threshold value) and/or predicted to become available, and a second replication mode (e.g., a multi-master replication mode) is selected when a sufficiently strong network connection is unavailable (e.g., latency above a particular threshold value) and/or predicted to become unavailable. The first replication mode may be used for real-time data replication or near real-time data replication (e.g., synchronization performed every 5 ms), and the second replication mode may be used for delayed data replication (e.g., synchronization performed every 4 hours). The computing system may adapt to accommodate changing network characteristics, and may switch between different replication modes, and/or perform different replication modes in parallel (or, concurrently).

In some embodiments, the computing system may use multiple replication modes concurrently, e.g., instead of, or in addition to, switching between replication modes. For example, a data update may be received (e.g., an update to a shared document), and a priority status (e.g., critical or non-critical) may be determined for the data update and/or portions of the data update. Critical data updates may be replicated using a first replication mode, and non-critical data updates may be replicated using a second replication mode. In some embodiments, critical data updates may be replicated using both the first replication mode and the second replication mode.

Various embodiments of the present disclosure include systems, methods, and non-transitory computer readable media configured to store a first data object, the first data object being associated with a corresponding second data object stored by a remote master replication system. One or more first network characteristics of a communication network are detected. A first replication mode is triggered based on the one or more first network characteristics of the communication network. The first replication mode includes receiving a first update of the first data object, generating a first update file in response to receiving the first update of the first data object, the first update file indicating the first update of the first data object, and providing the first update file to the remote master replication system over the communication network, the remote master replication system being configured to facilitate a real-time synchronization of the first data object and the second data object using the first update file. One or more second network characteristics of the communication network are detected. A second replication mode is triggered based on the one or more second network characteristics. The second replication mode includes receiving a second update of the first data object, generating a second update file, the second update file indicating the second update of the first data object, and providing the second update file to a second replication system, the second replication system facilitating a delayed synchronization of the first data object and the second data object using the second update file.

In some embodiments, the one or more first network characteristics comprise any of latency, bandwidth, throughput, or network connection status.

In some embodiments, the first replication mode comprises a single-master replication mode, and the second replication mode comprises a multi-master replication mode.

In some embodiments, the second replication mode further includes generating an alert based on any of the one or more second network characteristics, or the second replication mode, and presenting the alert to a user of the system.

In some embodiments, the systems, methods, and non-transitory computer readable media configured to generate an alert based on any of the one or more second network characteristics, or the second replication mode, and present the alert to a user of the system.

In some embodiments, the systems, methods, and non-transitory computer readable media configured to determine a priority status of at least a portion of the first update of the first data object, and the first replication mode is triggered based on the priority of status of the at least a portion of the first update of the first data object.

In some embodiments, the second replication system comprises a multi-master replication system, and the second replication mode further includes providing, by the second replication system, the second update file to the remote multi-master replication system, generating, by the remote multi-master replication system, a third update file, the third update file indicating the second update of the first data object, providing, by the remote multi-master replication system, the third update file to the remote master replication system, and updating, by the remote master system, the second data object using the third update file.

In some embodiments, the second replication mode further includes obtaining, by the second replication system, one or more third data objects, the one or more third data objects being associated with corresponding one or more fourth data objects stored by a remote multi-master replication system, the second update file further indicating the one or more third data objects, and synchronizing, by the remote multi-master replication system, the one or more third data objects and the one or more fourth data objects using the second update file. In some embodiments, the third and fourth data objects comprise immutable data objects and the first and second data objects comprises mutable data objects.

In some embodiments, the third and fourth data objects represent a geographic map, and the first and second data objects represent a point of interest of the geographic map.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

Under conventional approaches, data synchronization may involve transmitting data from a first system to a second system over a network. For example, data may be pushed or pulled from the first system to update corresponding data on the second system. However, typical data synchronization schemes do not account for changes in network performance characteristics. For example, highly-fault tolerant data synchronization schemes may fail to take advantage of strong network connections and may become a bottleneck in various situations (e.g., multi-user collaboration), while low-fault tolerant data synchronization schemes may not function when operated over an unreliable network.

A claimed solution rooted in computer technology overcomes problems specifically arising in the realm of computer technology. In various implementations, a computing system is configured to provide methods and systems that facilitate adaptive data replication and/or synchronization. For example, different data replications modes may be selected based on network performance characteristics (e.g., latency, bandwidth, throughput, connected or disconnected network status, and the like.). In some embodiments, a first replication mode (e.g., a single-master replication mode) is selected when a sufficiently strong network connection is available (e.g., latency below a particular threshold value) and/or predicted to become available, and a second replication mode (e.g., a multi-master replication mode) is selected when a sufficiently strong network connection is unavailable (e.g., latency above a particular threshold value) and/or predicted to become unavailable. The first replication mode may be used for real-time data replication or near real-time data replication (e.g., synchronization performed every 5 ms), and the second replication mode may be used for delayed data replication (e.g., synchronization performed every 4 hours). The computing system may adapt to accommodate changing network characteristics, and may switch between different replication modes, and/or perform different replication modes in parallel (or, concurrently).

In some embodiments, the computing system may use multiple replication modes concurrently, e.g., instead of, or in addition to, switching between replication modes. For example, a data update may be received (e.g., an update to a shared document), and a priority status (e.g., critical or non-critical) may be determined for the data update and/or portions of the data update. Critical data updates may be replicated using a first replication mode, and non-critical data updates may be replicated using a second replication mode. In some embodiments, critical data updates may be replicated using both the first replication mode and the second replication mode.

Figure 1:
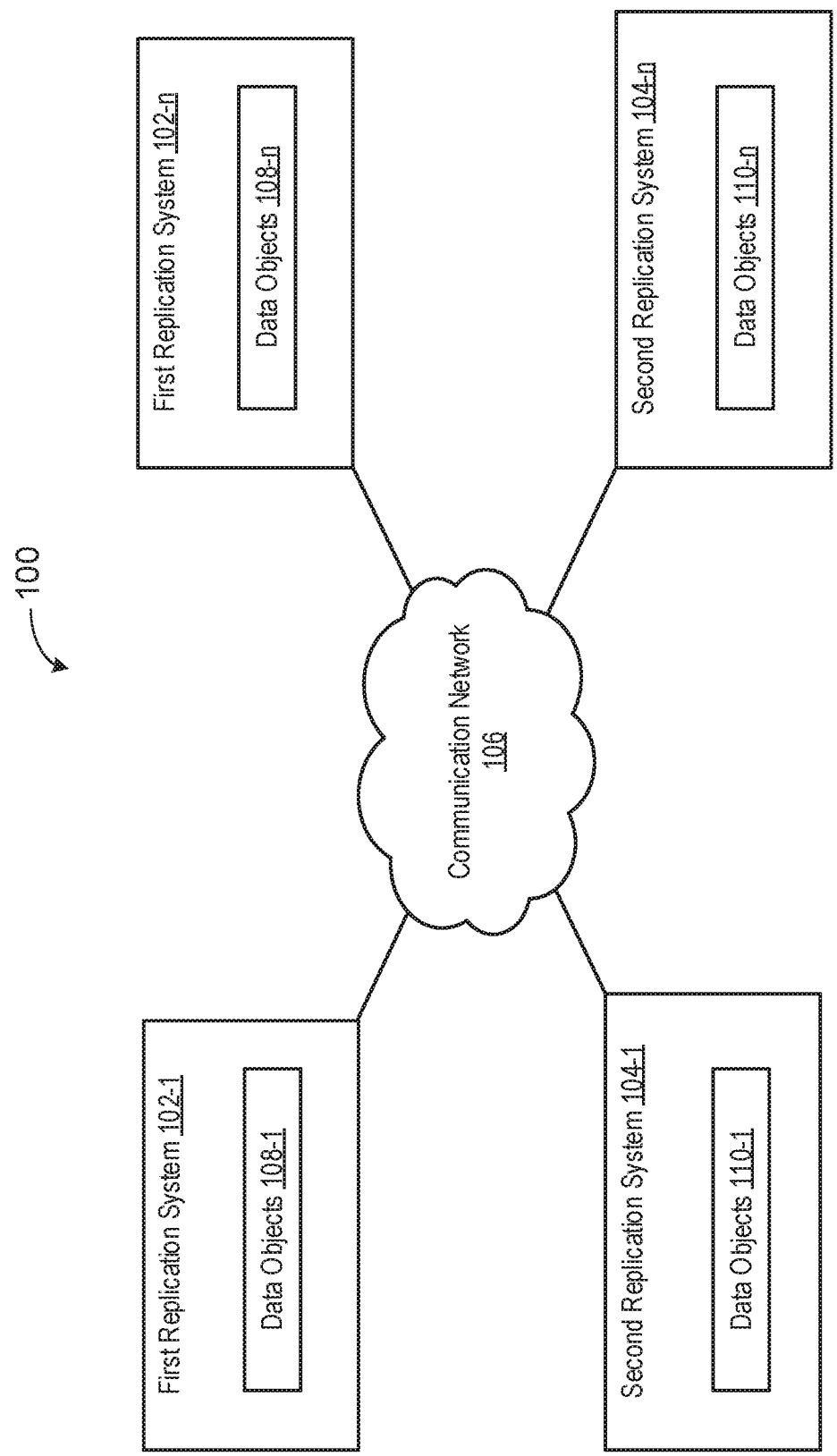
FIG. 1 depicts a diagram of an example of a system for adaptive data replication according to some embodiments.

FIG. 1 depicts a diagram of an example of a system 100 for adaptive data replication according to some embodiments. The example system 100 shown in FIG. 1 includes first replication systems 102-1 to 102-*n* (individually, the first replication system 102, collectively, the first replication systems 102), second replication systems 104-1 to 104-*n* (individually, the second replication system 104, collectively, the second replication systems 104), and a communication network 106.

The first replication systems 102 may function to share, replicate, and/or synchronize data over one or more communication networks. In various embodiments, functionality of the replication systems 102 can be performed by one or more servers, workstations, desktop computers, laptop computers, mobile devices (e.g., smartphone or tablet computer), and the like. The replication systems 102 may be geographically distributed across any number of geographic area, or may be within the same geographic area (e.g., a particular data center).

In some embodiments, the first replication systems 102 may comprise a single-master (or, "master-client") replication system. The first replication systems 102 may operate as master replication systems and/or client replication systems depending on context. In one example, each of the first replication systems 102 may be capable of operating as a master replication system for data it owns (e.g., data it created), and each of the first replications systems 102 may be capable of operating as a client replication system for data shared by the client replication system but owned by a different first replication system 102. When operating as a master, a first replication system 102 may be referred to as a master replication system 102. Similarly, when operating as a client, a first replication system 102 may be referred to as a client replication system 102. Additionally, since the first replication systems 102 may share data owned by a variety of different first replication systems 102, it will be appreciated that a first replication system 102 may operate simultaneously as both a master replication system with respect to some data, and a client replication system with respect to other data.

In some embodiments, the first replication systems 102 function to store corresponding data objects 108-1 to 108-*n* (individually, the data object 108, collectively, the data objects 108). In some embodiments, each object data object 108 has a designated owner (or, "master") first replication system 102 and may only be modified by the owner. For example, the data object 108-1 may be created and/or owned by the first replication system 108-1, and the data object 108-*n* may comprise a copy (e.g., a local copy) of the of the data object 108-1. The first replication system 102-*n* may modify data objects 108-*n*, and provide the modifications (or, "updates") to the first replication system 102-1, which can update the master data object 108-1 accordingly.

As used herein, data objects (e.g., data objects 108 and/or 110) may store data in arrays, tables, an object-oriented framework, or otherwise. Data objects may store media data (e.g., audio, images, photographs, pictures, video, and the like), and/or other types of data. In some embodiments, data objects may store data representing geographic maps, and/or points of interest (e.g., landmarks) of geographic maps. For example, points of interest may be stored as an array of identifiers associated with corresponding landmarks. The data objects may store data, for example, in one or more tables of a relational database, in one or more arrays, or in an object-oriented framework. However, the embodiments described herein are not limited to relational databases, and any type of datastore may be used, e.g., relational databases, hierarchical databases, and object-oriented databases.

In some embodiments, the first replication systems 102 function to adaptively replicate data objects 108. As used herein, reference to a data object may include the entire data object, or portion thereof (e.g., a modified portion of a data object 108 and/or a modification of a data object 108). For example, the first replication systems 102 may replicate data objects 108 using a replication mode selected based on actual and/or predicted network performance characteristics, and/or based on a status priority of the data objects 108. Network performance characteristics may include latency, bandwidth, throughput, connection status (e.g., connected or disconnected), and the like. Status priority may include "critical" or "non-critical". A critical modification may include removing a point of interest from a map, or other time-sensitive modification. A non-critical modification may include changing a profile picture associated with a user making a modification, or other modification that is not time-sensitive. In one example, a first replication system 102 may (i) replicate data using a single-master replication mode if a strong network connection is detected and/or if the data to be replicated is critical, and/or (ii) provide the data to be replicated to a second replication system (e.g., second replication system 104 implementing a multi-master replication mode, discussed below) if a weak network connection is detected and/or if the data to be replicated is non-critical.

The second replication systems 104 may function to share, replicate, and/or synchronize data over one or more communication networks. In some embodiments, the second replication systems 104 comprise multi-master replication systems, e.g., of the type described in U.S. patent application Ser. No. 15/456,256, entitled "Systems and Methods for Data Replication Synchronization," filed Mar. 10, 2017, and U.S. Patent Application No. 62/438,190, entitled "Systems and Methods for Data Replication Synchronization," filed Dec. 22, 2016, both of which are incorporated herein by reference in their entirety. In various embodiments, functionality of the second replication systems 104 can be performed by one or more servers, workstations, desktop computers, laptop computers, mobile devices (e.g., smartphone or tablet computer), and the like. The second replication systems 104 may be geographically distributed across any number of geographic areas, or may be within the same geographic area (e.g., a particular data center).

In some embodiments, the second replication systems 104 function to asynchronously propagate changes made to data objects 108 and/or data objects 110 to one or more of the other replication second systems 104. For example, in a full-mesh topology, each second replication system 104 may be able to propagate changes to any other second replication systems 104, although embodiments also support partial-mesh topologies. In an asynchronous replication scheme, each data object 110 may be loosely consistent with the other data objects 110. For example, the data objects 110 may diverge from time to time such that at any given moment, one replication system's view of the body of data associated with the data objects 110 may be different from another replication system's view of the body of data. In the absence of new changes, the data objects 110 may be expected to eventually become consistent with one another. In some embodiments, as well as being loosely consistent with one another, the data objects 110 can also be said to be eventually consistent.

In some embodiments, the data objects 110 comprise the same type of data object as the data objects 108. In some embodiments, the data objects 110 may include one or more immutable components. For example, an immutable component may comprise one or more content items (e.g., a file, binary, and the like) that may not be modified. Accordingly, the second replication systems 104 may effectively modify a component (e.g., a PDF document) by adding a new immutable component (e.g., a second version of the PDF document), and/or removing an existing immutable component.

In some embodiments, the second replication systems 104 function to perform delayed replication and/or synchronization. For example, the second replication systems 104 may function to replicate data at predetermined intervals, e.g., as opposed to in real-time or near real-time. The predetermined intervals may be based on network characteristics, and/or other factors. The second replications systems 104 may utilize a multi-master replication mode, which may be beneficial when real-time or near real-time (or, collective, "real-time") replications are unnecessary and/or when a strong network connection is unavailable. In some embodiments, the second replication systems 104 may receive data from one or more remote systems (e.g., first replication systems 102) and provide the data to one or more other remote systems (e.g., a remote second replication system 104). For example, a second replication system 104 may generate a replication message (or, update message) based on the received data, and configure the message for a high-latency transmission and/or multi-master transmission. In some embodiments, the second replication system 104 may not be optimized to replicate some types of data (e.g., low-latency, high scale sensor feeds), and first replication systems 102 may attempt to send references to data. In some embodiments, the user interface may display an error when attempting to show or access data without a strong network connection.

The communication network 106 may represent one or more computer networks (e.g., LAN, WAN, or the like) or other transmission mediums. The communication network 106 can provide communication between first replication systems 102, the second replication system 104, and/or other systems. In some embodiments, the communication network 106 comprises one or more computing devices, routers, cables, buses, and/or other network topologies (e.g., mesh, hub-and-spoke, and the like). In some embodiments, the communication network 104 may be wired and/or wireless. In various embodiments, the communication network 104 may comprise the Internet, one or more wide area networks (WANs) or local area networks (LANs), one or more networks that may be public, private, IP-based, non-IP based, and so forth. Communication networks and transmission mediums are discussed further herein. In various embodiments, the communication network 106 comprises any transitory or non-transitory computer readable medium (e.g., CD. DVD, and the like).

In some embodiments, the communication network 106 comprises one or more different communication networks, which may be have the same, similar, and/or different network performance characteristics. For example, a first communication network 106 may be used for real-time communication and/or single-master replication between first replication system 102, a second communication network 106 may be used for communication between a first replication system 102 and a second replication system 104, and a third communication network 106 may be used for communication between second replication systems 104, and the like.

Figure 2:
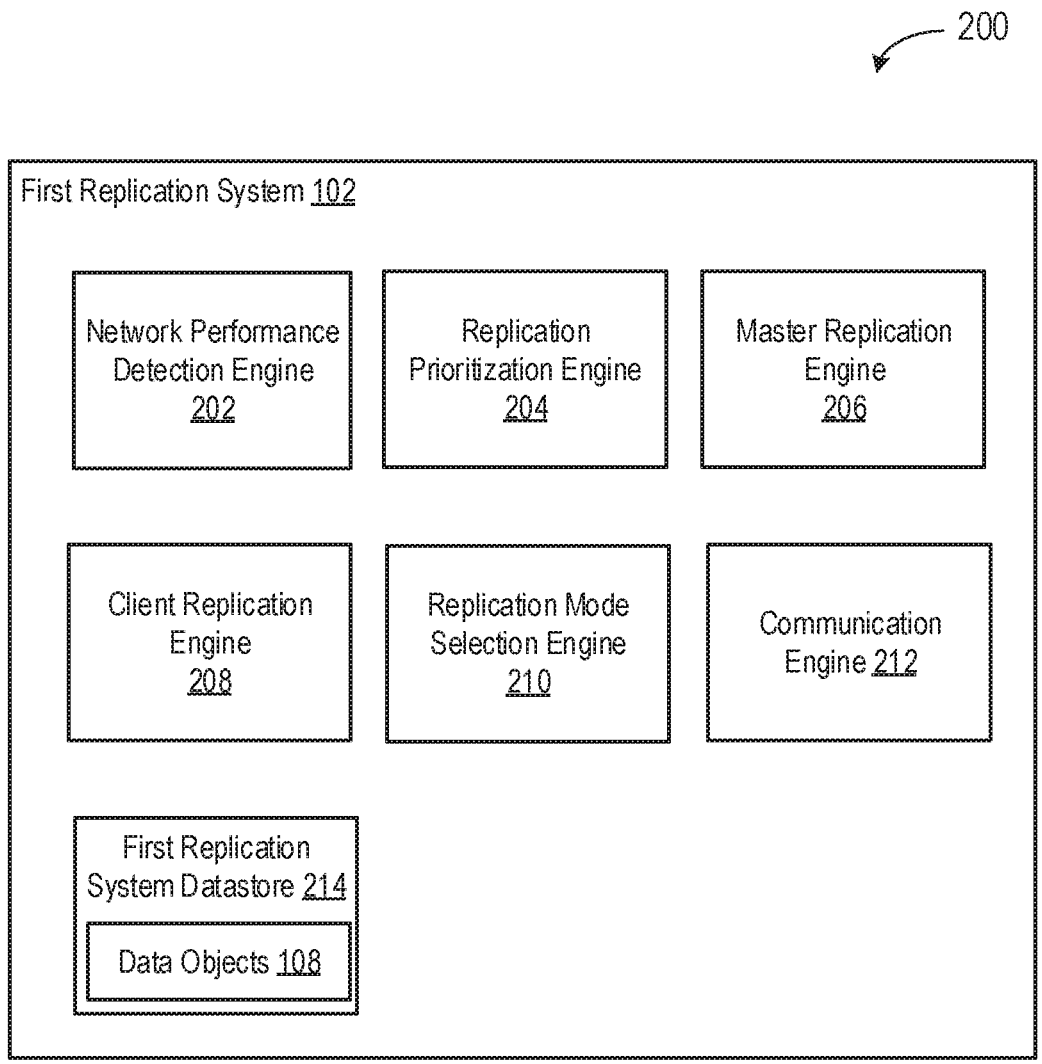
FIG. 2 depicts a diagram of an example of a first replication system (e.g., a single-master replication system) according to some embodiments.

FIG. 2 depicts a diagram 200 of an example of a first replication system 102 (e.g., a single-master replication system) according to some embodiments. In the example of FIG. 2, the first replication system 102 includes a network performance detection engine 202, a replication prioritization engine 204, a master replication engine 206, a client replication engine 208, a replication mode selection engine 210, a communication engine 212, and a first replication system datastore 214.

The network performance detection engine 202 may function to determine one or more network performance characteristics of one or more associated communication networks (e.g., communication network 106). In some embodiments, the network performance detection engine 202 determines actual and/or anticipated network performance characteristics. For example, the network performance detection engine 202 may log historical network performance characteristics, and/or otherwise access historical network performance characteristics, of one or more communication networks, and use the historical network performance characteristics to determine anticipated network performance characteristics.

The replication prioritization engine 204 may function to determine a replication priority status and/or replication categorization (or, collectively, "priority status") of a replication message. A replication message may include an update request to modify a shared data object (e.g., an original data object or a copy of a data object). For example, a replication message may include one or more data objects and/or one or more associated identifiers. The identifiers may be associated with one or more points of interest of a geographic map. In some embodiments, the points of interest may be stored in a first data object 108 and the geographic map may be stored in a second data object 110.

In some embodiments, a priority status may include one or more context-based priority identifiers associated with a replication message and/or portions of a replication message. As used herein, functionality performed with respect to a replication message may be similarly performed for one or more portions of a replication message. For example, the replication prioritization engine 204 may parse a replication message, and determine corresponding context-based priority identifiers for some or all portions of the replication message. In some embodiments, context may include an activity associated with the replication message (e.g., multi-user collaboration of a shared data object), one or more network performance characteristics of a communication network associated with the replication message, a relative importance of a replication message (e.g., critical or non-critical), transmission requirements associated with the replication message (e.g., suggested and/or required threshold network performance characteristics needed to perform the replication) and/or the like. For example, a replication message for updating a point of interest of a geographic map during a collaborative editing session may be assigned a critical priority status because the relative importance of the update is high (e.g., because users rely on real-time synchronization of points of interest). Similarly, a replication message for updating a profile picture of a user associated with the replication message may be assigned a non-critical priority status (e.g., because users do not rely on real-time synchronization of changes in profile pictures).

The master replication engine 206 may function to implement features of a master node of a single-master replication mode. For example, the master replication engine 206 may generate replication messages, designate owners of data objects 108, and create, read, update, delete, and/or otherwise access data objects 108. In some embodiments, the master replication engine 206 receives and processes replication messages to facilitate real-time and/or delayed synchronization of data objects 108. Real-time synchronization may include synchronizations that are processed, or expected to be processed, within a threshold amount of time and/or frequency. For example, real-time synchronizations may provide, receive, and/or exchange synchronization data (e.g., replication messages) every 5 ms. Delayed synchronizations may include synchronizations that are processed, or expected to be processed, within an increased threshold amount of time and/or frequency relative to real-time synchronizations. For example, delayed synchronizations may provide, receive, and/or exchange synchronization data every 4 hours.

In some embodiments, the master replication engine 206 may function to resolve replication conflicts (or, "deconflict" replication conflicts). For example, the master replication engine 206 may receive conflicting replication messages from multiple client replication systems 102, and/or receive conflicting replication messages provided using different replication modes. Conflicts may be resolved manually (e.g., by a user) and/or automatically (e.g., without requiring user input). In one example, the master replication engine 206 may receive a first replication message to modify a data object 108 provided using a single-master replication mode, and receive a second replication message to modify the same data object provided using a multi-master replication mode. The single-master replication mode may be configured to facilitate real-time synchronizations, while the multi-master replication mode may be configured to facilitate delayed synchronizations, which may result in conflicts. Conflicts may be resolved based on a first-to-arrive basis (e.g., the first replication message received wins and is processed) and/or based on deconfliction rules in replication engine 104. For example, some conflicting edits to a data object without multiplicity (e.g., the date of an event) may require manual or automatic deconfliction. In some embodiments, conflicting edits to a data object with multiplicity (e.g., aliases for a person) may be merged automatically.

The client replication engine 208 may function to implement features of a slave node of a single-master replication mode. In some embodiments, the client replication engine 208 functions to generate and provide replication messages to a master replication system 102, and receive and process replication messages received from a master replication system 102. In some embodiments, the client replication engine 208 performs local deconfliction of a replication message prior to providing the replication message to the master replication system. For example, a replication message may include multiple update requests corresponding to the same data object, and conflicts may be resolved on a first-to-arrive basis at the client replication system 102.

In some embodiments, the client replication engine 208 may generate and/or present (e.g., display) alerts or other notifications based on network performance characteristics of a one or more associated communication networks. For example, if a client replication system 102 becomes disconnected from a master replication system 102, or a disconnection is anticipated, the client replication engine 208 may generate and/or present an alert indicating the one or more network performance characteristics.

In some embodiments, the client replication engine 208 may function to generate local copies of data objects 108 and/or prevent access to data objects 108 (e.g., based on network performance characteristics). In some embodiments, the master replication engine 206 may prevent access to data objects 108 instead of, or in addition to, the client replication engine 208. In one example, if a client replication system 102 becomes disconnected from a master replication system 102, the client replication engine 208 may create a local copy of the data object 108, and modifications may be applied to the local copy. The modifications may be batched and replicated to the master replication system. For example, the modification may be provided directly to the master replication system 102 using a single-master replication mode when a sufficient network connection is available (e.g., based on one or more network performance characteristic threshold values), and/or the modifications may be provided to a second replication system which can facilitate replication of the modifications using a multi-master replication mode.

The replication mode selection engine 210 may function to select a replication mode for replicating data. In some embodiments, the replication modes may include a single-master replication mode, a multi-master replication mode, and a parallel (or, "combined") replication mode. A parallel replication mode may include adaptively performing single-master replication and multi-master replication in parallel.

For example, an update request may include portions associated with different priority status' (e.g., critical or non-critical). The portions of the update request flagged as critical may be replicated using a single-master replication, and portions of the update request flagged as non-critical may be replicated using a multi-master replication mode. This may help ensure, for example, that performance of the single-master replication mode is not unnecessarily eroded by non-critical updates. In some embodiments, critical updates may be provided using both a single-master replication mode and a multi-master replication mode. This may help improve, for example, the likelihood that critical updates are properly received and processed. In some embodiments, the single-master replication mode may comprise a higher-performance (e.g., low-latency) but lower-fault tolerant replication mode, while the multi-master replication mode may comprise a lower-performance (e.g., high-latency) but higher-fault tolerant replication mode.

The communication engine 212 may function to send requests, transmit and, receive communications, and/or otherwise provide communication with one or a plurality of systems. In some embodiments, the communication engine 212 functions to encrypt and decrypt communications. The communication engine 212 may function to send requests to and receive data from a system through a network or a portion of a network. Depending upon implementation-specific or other considerations, the communication engine 212 may send requests and receive data through a connection, all or a portion of which may be a wireless connection. The communication engine 212 may request and receive messages, and/or other communications from associated systems.

The first replication system datastore 214 may function to store, at least temporarily, data received from one or more other systems. For example, the first replication system datastore 214 may store messages received by the communication engine 212, and data objects 108. Like other datastores described herein, the first replication system datastore 214 may reside local to the first replication system 102, and/or comprise a remote storage system (e.g., a cloud storage system).

Figure 3:
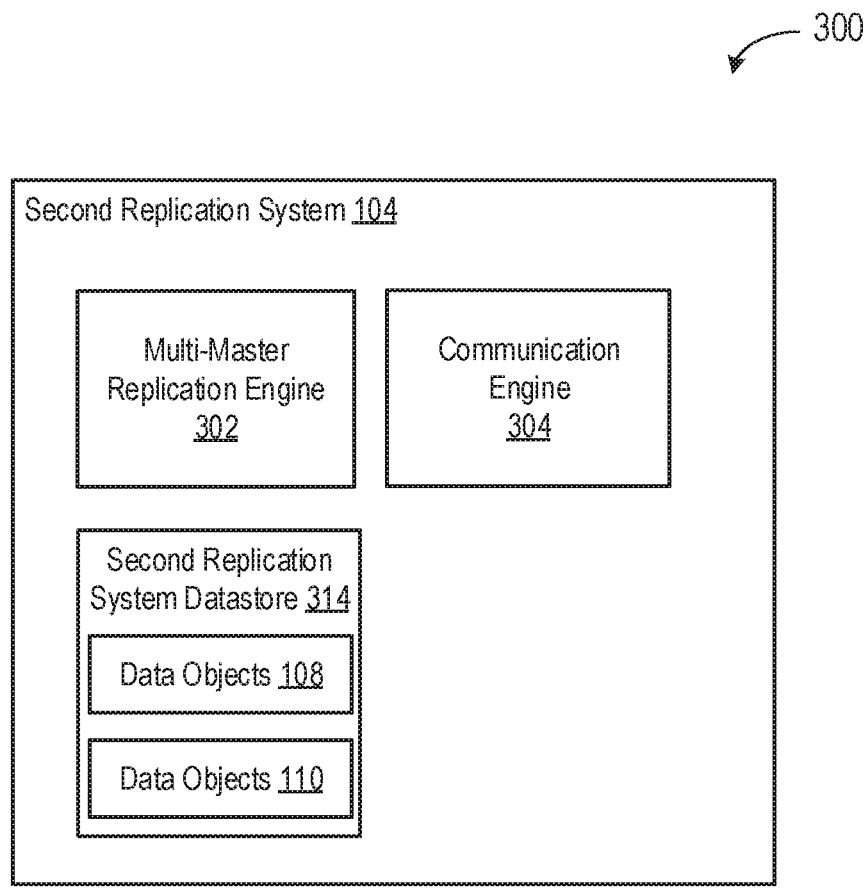
FIG. 3 depicts a diagram of an example of a second replication system (e.g., a multi-master replication system) according to some embodiments.

FIG. 3 depicts a diagram 300 of an example of a second replication system 104 (e.g., a multi-master replication system) according to some embodiments. In the example of FIG. 3, the second replication system 104 includes a multi-master replication engine 302, a communication engine 304, and a second replication system datastore 306.

The multi-master replication engine 302 may function to implement a multi-master replication mode. For example, the multi-master replication engine 302 may receive data from remote systems (e.g., first replication systems 102) and replicate the data to one or more other remote systems (e.g., second replications systems 104 and/or first replication system 102) using a multi-master replication mode. In some embodiments, the multi-master replication engine 302 may obtain data objects 108 and batch the data objects 108 with one or more previously scheduled replications of one or more data objects 110.

In some embodiments, the multi-master replication engine 302 functions to receive, parse, and/or process replication messages. For example, the multi-master replication engine 302 may identify data objects 108 and data objects 110, process the data objects 110 (e.g., facilitate a synchronization of corresponding data objects 110 using the data objects 110 of the replication message), and provide a replication message for the data objects 108 to an intended target system (e.g., a first replication system 102).

The communication engine 304 may function to send requests, transmit and, receive communications, and/or otherwise provide communication with one or a plurality of systems. In some embodiments, the communication engine 304 functions to encrypt and decrypt communications. The communication engine 304 may function to send requests to and receive data from a system through a network or a portion of a network. Depending upon implementation-specific or other considerations, the communication engine 304 may send requests and receive data through a connection, all or a portion of which may be a wireless connection. The communication engine 304 may request and receive messages, and/or other communications from associated systems.

The second replication system datastore 306 may function to store, at least temporarily, data received from one or more other systems. For example, the second replication system datastore 306 may store messages received by the communication engine 304, data objects 108, and data objects 110. Like other datastores described herein, the second replication system datastore 306 may reside local to the second replication system 104, and/or comprise a remote storage system (e.g., a cloud storage system).

Figure 4:
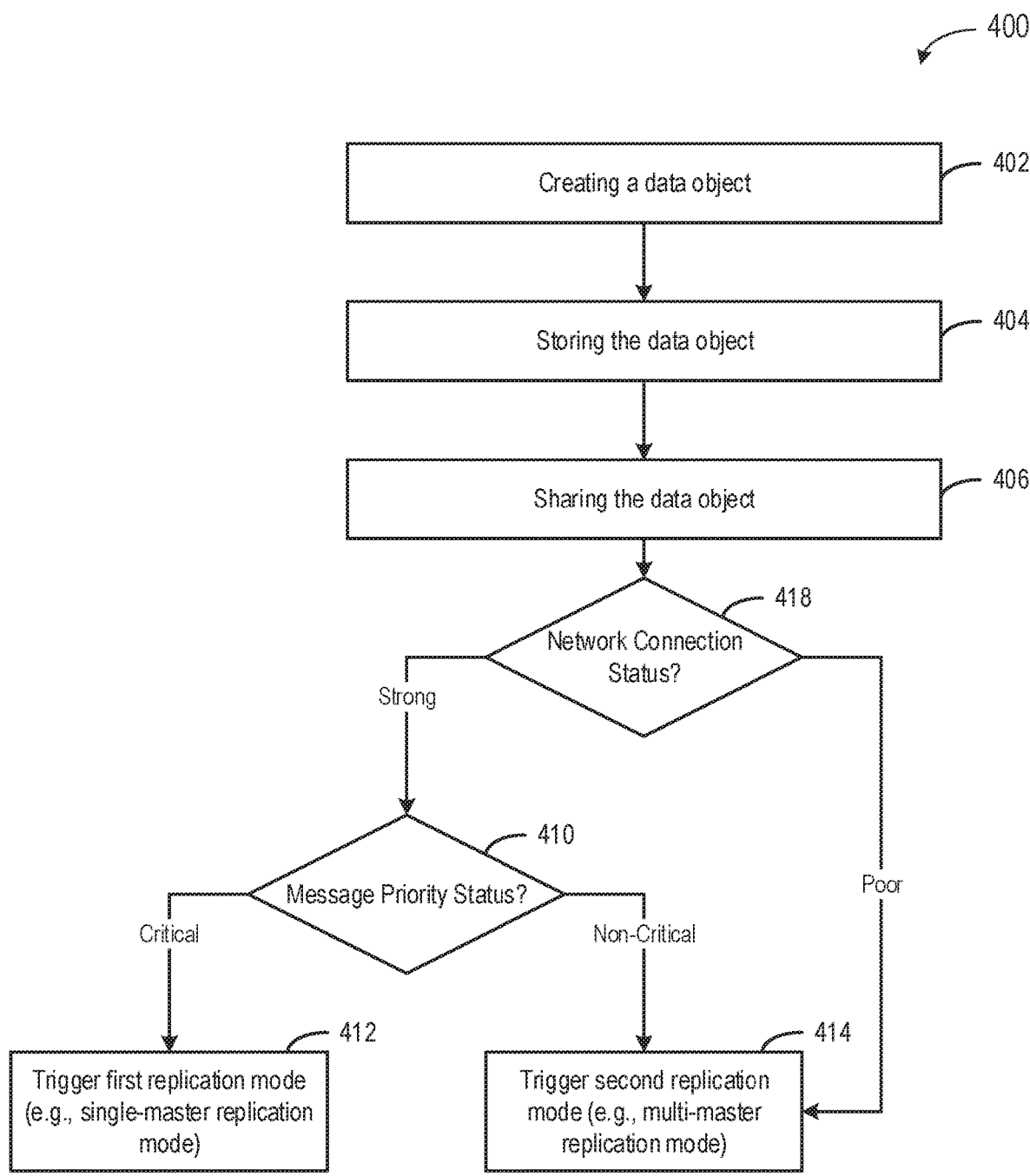
FIG. 4 depicts a flowchart of an example of a method for adaptive data replication according to some embodiments.

FIG. 4 depicts a flowchart 400 of an example of a method for adaptive data replication according to some embodiments. In this and other flowcharts, the flowchart 400 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

In step 402, a master replication system (e.g., first replication system 102-1) creates a data object (e.g., data object 108-1). For example, the data object may comprise one or more points of interest associated with a geographic map stored by the same or different data object (e.g., data object 110) that may be shared with one or more remote systems (e.g., client replication systems 102). In some embodiments, a master replication engine creates the data object (e.g., master replication engine 206).

In step 404, the master replication system stores the data object. In some embodiments, the master replication stores the data object in a datastore (e.g., first replication system datastore 214).

In step 406, a master replication system shares the data object with one or more client replication systems (e.g., client replication system 102). For example, the client replication systems may obtain a copy of the data object (e.g., data object 108-1) from the master replication system over a communication network (e.g., communication network 106). If the client replication system wishes to modify the data object (e.g., add and/or remove points of interest), the client replication system may provide a modification request to the master replication system, and the master replication system can either approve the request and perform the modification, or deny the request. If the request is approved, the modification may be reflected in the copy of the data object. Alternatively, the copy of the data object may be modified, at least temporarily, upon providing the request, and the modification may be confirmed when the request is approved, or rolled back if the request is denied. In some embodiments, a client replication engine (e.g., client replication engine 206) obtains the copy of the data object, and/or the master replication engine shares the data object.

In step 408, the client replication system detects one or more network performance characteristics of the communication network. In some embodiments, a network performance detection engine (e.g., network performance detection engine 202) detects the one or more network performance characteristics.

In step 410, the client replication system determines a priority status of the update request based on the one or more network performance characteristics (e.g., if the one or more network performance characteristics indicate a strong network connection). In some embodiments, a replication prioritization engine (e.g., replication prioritization engine 204) determines the priority status.

In step 412, the client replication system triggers a first replication mode (e.g. a single-master replication mode) based on the priority status (e.g., a critical priority status). The first replication mode may facilitate real-time data replication synchronization. In some embodiments, a replication mode selection engine (e.g., replication engine selection engine 210) triggers the first replication mode.

In step 414, the client replication system triggers a second replication mode (e.g., a multi-master replication mode) based on the priority status (e.g., a non-critical priority status). The second replication mode may provide delayed data replication and/or synchronization. In some embodiments, the replication mode selection engine triggers the second replication mode.

Figure 5:
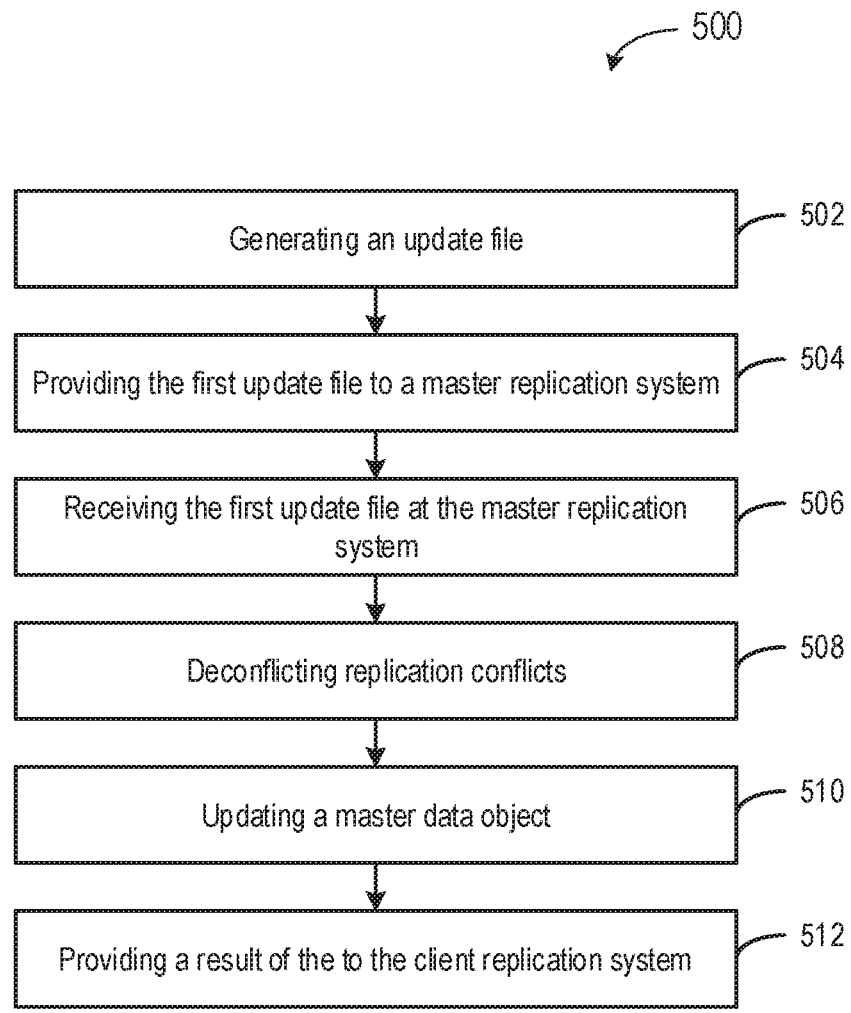
FIG. 5 depicts a flowchart of an example of a method for performing a first replication mode (e.g., a single-master replication mode) according to some embodiments.

FIG. 5 depicts a flowchart 500 of an example of a method for performing a first replication mode (e.g., a single-master replication mode) according to some embodiments.

In step 502, a first replication system (e.g., first replication system 102) generates a first update file (or, replication message) based on a received update associated with a data object (e.g., data object 108). The first update file is configured for single-master replication of the associated data, and/or configured to facilitate real-time synchronization of the associated data. For example, the first update file may conform to one or more parameters (e.g., data size, transmission protocols, and/or the like) to help ensure proper synchronization. In some embodiments, a client replication engine (e.g., client replication engine 208) generates the first update file.

In step 504, the first replication system provides the first update file over a communication network (e.g., communication network 106) to the master replication system (e.g., master replication system 102) that owns the data object. In some embodiments, the client replication engine identifies the owner of the data object and triggers a communication engine (e.g., communication engine 212) to provide the first update file to the owner.

In step 506, the master replication system receives the first update file over the communication network. In some embodiments, a master replication engine (e.g., master replication engine 206) receives the first update file from a communication engine (e.g., communication engine 212). In step 508, the master replication system deconflicts any conflicts associated with the first update file. In some embodiments, the master replication engine performs some or all of any deconfliction. In step 510, the master replication system updates the data object using the first update file. In some embodiments, the master replication engine updates the data object. In step 512, the master replication system provide a result of the update (e.g., success, failure, conflict, and/or the like) to the first replication system over the communication network. In some embodiments, the master replication triggers the communication to provide the result.

Figure 6:
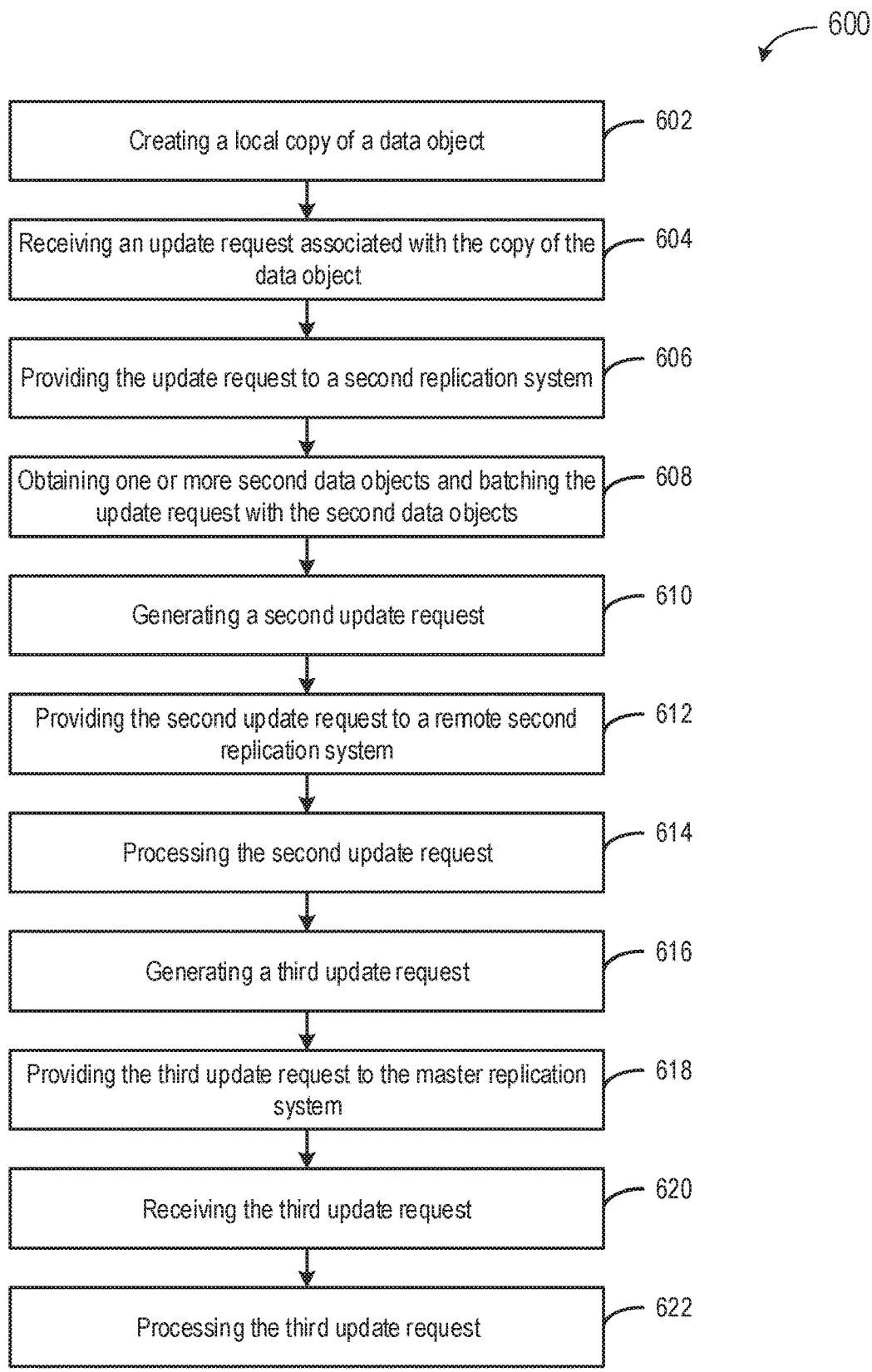
FIG. 6 depicts a flowchart of an example of a method for performing a second replication mode (e.g., a multi-master replication mode) according to some embodiments.

FIG. 6 depicts a flowchart 600 of an example of a method for performing a second replication mode (e.g., a multi-master replication mode) according to some embodiments.

In step 602, a first replication system (e.g., first replication system 102) creates a local copy of a data object (e.g., data object 108). The data object may comprise the original or master data object (e.g., stored by a master replication system that owns the data object), or may itself comprise a copy of the original or master data object. Access to the data object may be prevented. In some embodiments, a client replication engine (e.g., client replication engine 208) creates the local copy of the data object.

In step 604, the first replication system receives an update request associated with the copy of the data object. The update request may comprise a batch of modifications obtained over a period of time (e.g., a predetermined period of time). The first replication system may locally deconflict any conflicts associated with the batch of modifications. In some embodiments, the client replication performs the deconfliction.

In step 606, the first replication system provides the update request to a second replication system (e.g., a second replication system 104) over a communication network (e.g., a LAN or high-speed WAN). The second replication system comprises a multi-master replication system. The communication network may be a subnetwork of the communication network 106, or may be a different communication network altogether. The communication network may be different than a communication network used to provide communication between first replication systems when performing single-master replication. The second replication system may be selected by the first replication system based on network connectivity (e.g., one or more network performance characteristics) between the systems.

In step 608, the second replication system obtains one or more second data objects (e.g., data objects) 110 and batches the update request with the one or more second data objects. The update request and the second data objects may be batched with a previously scheduled replication of the second data objects. In some embodiments, a multi-master replication engine (e.g., multi-master replication engine 302) obtains the second data objects and batches the update request the second objects.

In step 610, the second replication system generates a second update request based on the first update request. In some embodiments, the second update request may include the first update request and the second data objects. In some embodiments, the multi-master replication engine generates the second update request.

In step 612, the second replication system provides the second update request over a communication network (e.g., a high latency communication network) to a remote second replication system (e.g., a remote second replication system 104). The communication network may be a subnetwork of the communication network 106, or may be a different communication network altogether. The communication network may be different than a communication network used to provide communication between first replication systems when performing single-master replication. The remote second replication system may be selected by the second replication system based on network connectivity (e.g., one or more network performance characteristics) between the systems, and/or based on a network connective between remote second replication system and the master replication system.

In step 614, the remote second replication system process the second update request. For example, the remote second replication system may receive the second update request, parse the second update request, identify different data objects (e.g., data objects 108 and/or 110), and/or update corresponding data objects owned by the second replication. In some embodiments, a remote multi-master replication engine (e.g., multi-master replication engine 302) of the remote second replication system processes the second update request.

In step 616, the remote second replication system generates a third update request based on the second update request and/or data objects 108 associated with the second update request. In some embodiments, the remote multi-master replication engine generates the third update request.

In step 618, the remote second replication system provides the third update request to the master replication system. In some embodiments, remote multi-master replication engine identifies the master replication system and/or provides the third update request to the master replication over a communication network. The communication network may be a subnetwork of the communication network 106, or may be a different communication network altogether. The communication network may be different than a communication network used to provide communication between first replication systems when performing single-master replication.

In step 620, the master replication system receives the third update request. In some embodiments, a communication engine (e.g., communication engine 212) of the master replication system receives the third update request over the communication network, and a master replication engine (e.g., master replication engine 206 receives the third update request from the communication engine of the master replication system.

In step, 622, the master replication system processes the third update request. For example, the master replication system may deconflict conflicts, modify corresponding data objects, and provides results to client replication system of a result of the modification and/or deconfliction. In some embodiments, the master replication engine processes the third update request.

Figure 7:
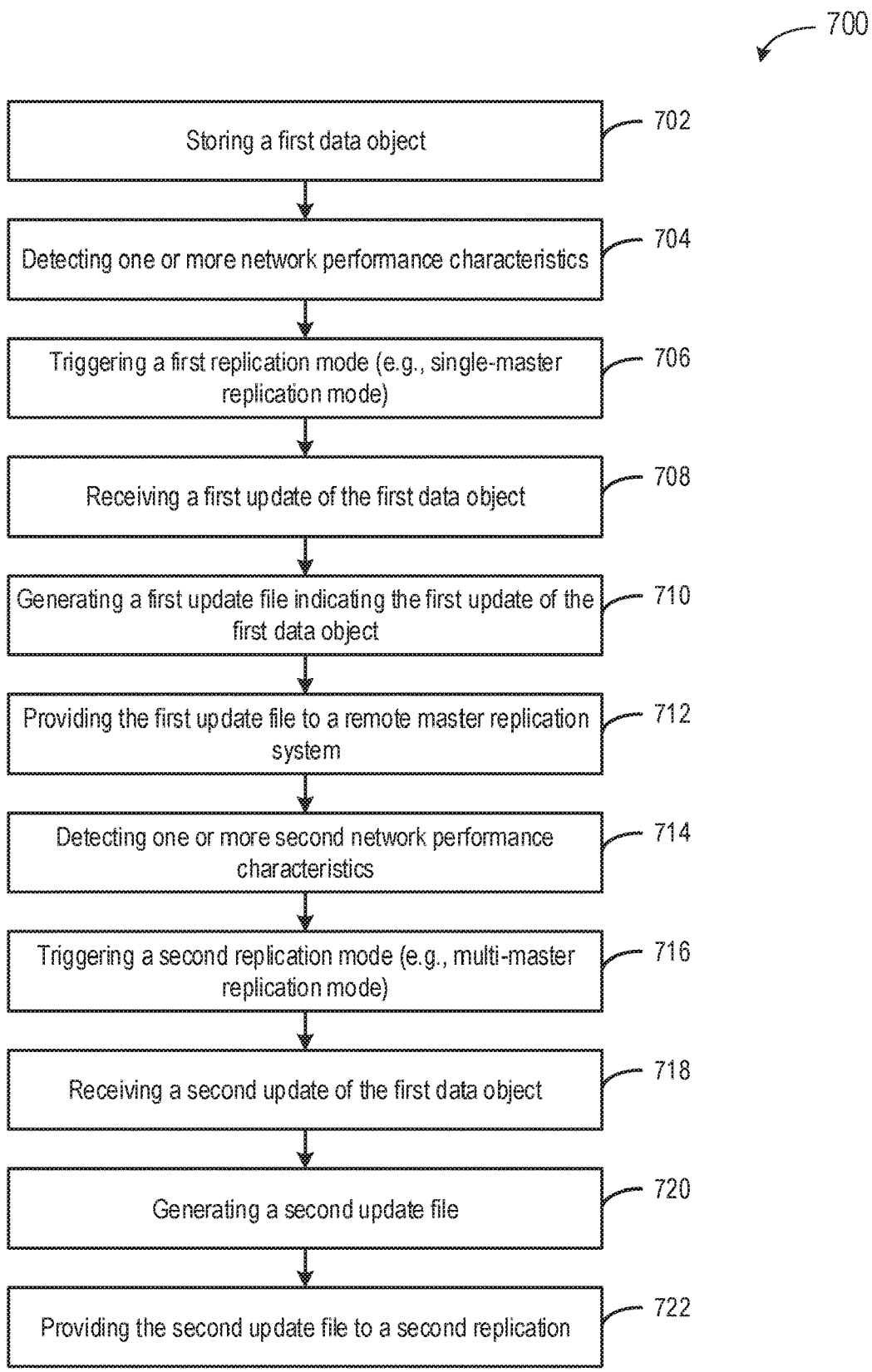
FIG. 7 depicts a flowchart of an example of a method of operation of a first replication system for performing adaptive data replication according to some embodiments.

FIG. 7 depicts a flowchart 700 of an example of a method of operation of a first replication system (e.g., first replication system 102) for performing adaptive data replication according to some embodiments.

In step 702, a first replication system (e.g., first replication system 102) storing a first data object (e.g., data object 108), the first data object being associated with a corresponding second data object (e.g., corresponding data object 108) stored by a remote master replication system (e.g., a master replication system 102). In some embodiments, a client replication engine (e.g., client replication engine 208) stores the first data object in a datastore (e.g., a first replication system datastore 214).

In step 704, the first replication system detects one or more first network characteristics of a communication network (e.g., communication network 106) associated with the first replication system. In some embodiments, a network performance engine (e.g., network performance engine 202) detects the one or more first network characteristics.

In step 706, the first replication system triggers a first replication mode (e.g., a single-master replication mode) based on the one or more first network characteristics (e.g., indicating a strong network connection) of the communication network. The first replication mode includes receiving a first update of the first data object (step 708), generating a first update file in response to receiving the first update of the first data object (step 710), the first update file indicating the first update of the first data object, and providing the first update file to the remote master replication system over the communication network (step 712). In some embodiments, a replication mode selection engine (e.g., replication mode selection engine 210) performs step 706, and the client replication engine performs steps 708-712.

In step 714, the first replication system detects one or more second network performance characteristics of the communication network associated with the first replication system. In some embodiments, the network performance engine detects the one or more second network characteristics.

In step 716, the first replication system triggers a second replication mode (e.g., a multi-master replication mode) based on the one or more second network characteristics (e.g., indicating a weak network connection). The second replication mode includes receiving a second update of the first data object (step 718), generating a second update file (step 720), and providing the second update file to a second replication system (step 722). In some embodiments, the replication mode selection engine (e.g., replication mode selection engine 210) performs step 716, and the client replication engine performs steps 718-722.

Hardware Implementation

Figure 8:
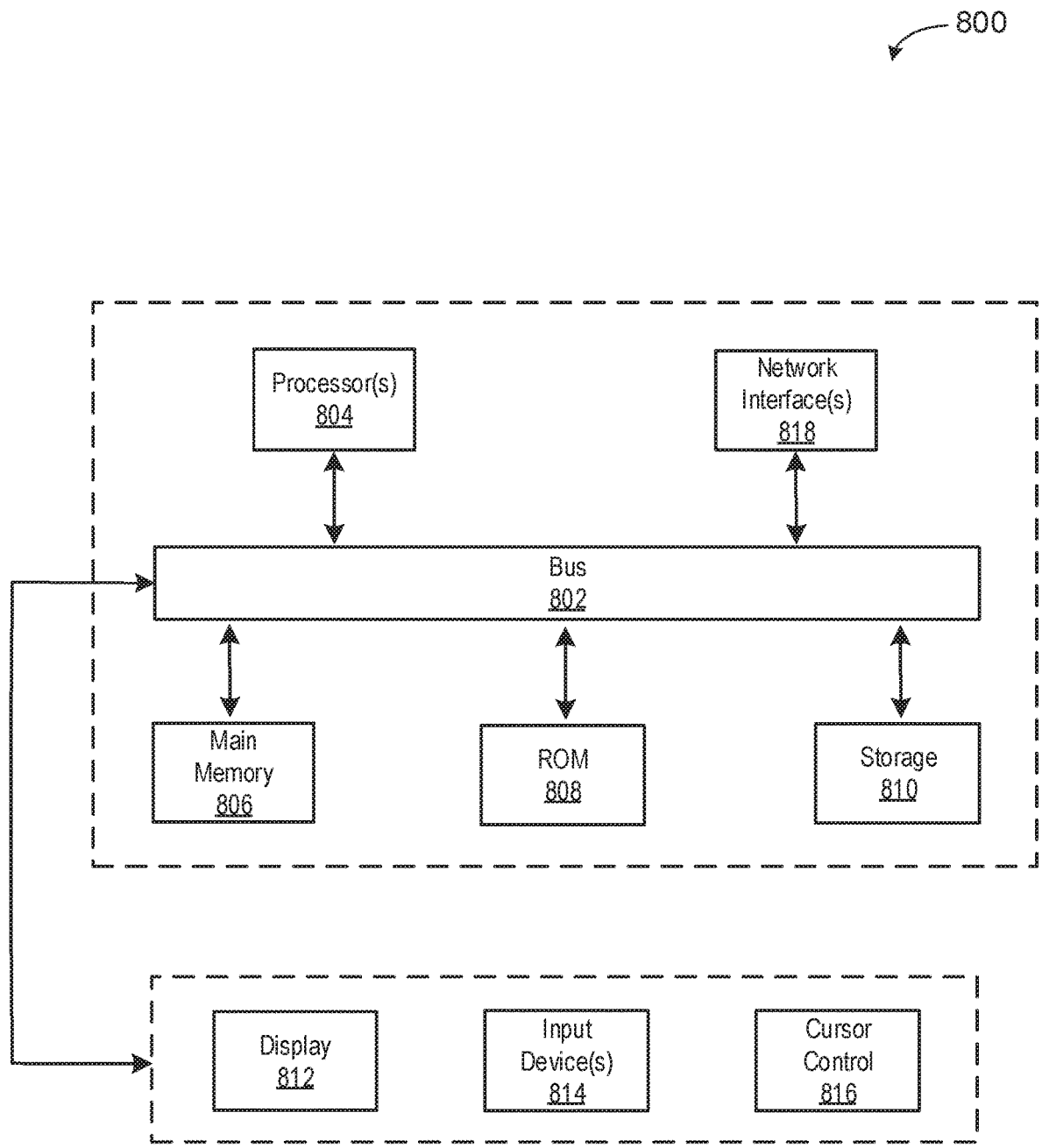
FIG. 8 depicts a block diagram of an example of a computer system upon which any of the embodiments described herein may be implemented.

FIG. 8 depicts a block diagram of an example of a computer system 800 upon which any of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may retrieves and executes the instructions. The instructions received by main memory 806 may optionally be stored on storage device 810 either before or after execution by processor 804.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "datastore," and/or "database" may comprise software, hardware, firmware, and/or circuitry. In one example, one or more software programs comprising instructions capable of being executable by a processor may perform one or more of the functions of the engines, datastores, databases, or systems described herein. In another example, circuitry may perform the same or similar functions. Alternative embodiments may comprise more, less, or functionally equivalent engines, systems, datastores, or databases, and still be within the scope of present embodiments. For example, the functionality of the various systems, engines, datastores, and/or databases may be combined or divided differently.

The datastores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

The invention claimed is:

1. A system comprising:
one or more processors; and
memory storing instructions that, when executed by the one or more processors, cause the system to perform:
storing a first data object, the first data object being associated with a corresponding second data object stored by a remote master replication system;
detecting one or more first network characteristics of a communication network;
triggering a single-master replication mode based on the one or more first network characteristics of the communication network;
detecting one or more second network characteristics of the communication network; and
triggering a multi-master replication mode based on the one or more second network characteristics, the multi-master replication mode including:
receiving a first update of the first data object;
generating a first update file, the first update file indicating the first update of the first data object;
providing the first update file to a first multi-master replication system over the communication network, the first multi-master replication system facilitating a delayed synchronization of the first data object and the second data object using the first update file;
obtaining, by the first multi-master replication system, a third data object, wherein the third data object is associated with a corresponding fourth data object stored by a second multi-master replication system;
generating, by the first multi-master replication system, a second update file indicating the first update of the first data object and the third data object;
providing, by the first multi-master replication system, the second update file to the second multi-master replication system;
synchronizing, by the second multi-master replication system, the third data object and the fourth data object using the second update file;
generating, by the second multi-master replication system, a third update file, the third update file indicating the first update of the first data object;
providing, by the second remote multi-master replication system, the third update file to the remote master replication system; and
updating, by the remote master replication system, the second data object using the third update file.

2. The system of claim 1, wherein the one or more first network characteristics comprise one or more of latency, bandwidth, throughput, or network connection status.

3. The system of claim 1, wherein the communication network is a first communication network, and wherein the first update file is provided to the second multi-master replication system over a second communication network different from the first communication network.

4. The system of claim 1, wherein the multi-master replication mode further includes:
generating an alert based on at least one of the one or more second network characteristics; and
presenting the alert to a user of the system.

5. The system of claim 1, wherein the instructions further cause the system to perform:
determining a priority status of at least a portion of the first update of the first data object; and
wherein the multi-master replication mode is triggered based on the priority status of the at least a portion of the first update of the first data object.

6. The system of claim 1, wherein the second update file includes the first update file batched with a previously scheduled replication of the third data object.

7. The system of claim 1, wherein the third and fourth data objects comprise immutable data objects and the first and second data objects comprise mutable data objects.

8. The system of claim 7, wherein the third and fourth data objects represent a geographic map, and the first and second data objects represent a point of interest of the geographic map.

9. A method being implemented by a computing system including one or more physical processors and storage media storing machine-readable instructions, the method comprising:
    storing a first data object, the first data object being associated with a corresponding second data object stored by a remote master replication system;
    detecting one or more first network characteristics of a communication network;
    triggering a single-master replication mode based on the one or more first network characteristics of the communication network;
    detecting one or more second network characteristics of the communication network; and
    triggering a multi-master replication mode based on the one or more second network characteristics, the multi-master replication mode including:
        receiving a first update of the first data object;
        generating a first update file, the first update file indicating the first update of the first data object;
        providing the first update file to a first multi-master replication system over the communication network, the first multi-master replication system facilitating a delayed synchronization of the first data object and the second data object using the first update file;
        obtaining, by the first multi-master replication system, a third data object, wherein the third data object is associated with a corresponding fourth data object stored by a second multi-master replication system;
        generating, by the first multi-master replication system, a second update file indicating the first update of the first data object and the third data object;
        providing, by the first multi-master replication system, the second update file to the second multi-master replication system;
        synchronizing, by the second multi-master replication system, the third data object and the fourth data object using the second update file;
        generating, by the second multi-master replication system, a third update file, the third update file indicating the first update of the first data object;
        providing, by the second remote multi-master replication system, the third update file to the remote master replication system; and
        updating, by the remote master replication system, the second data object using the third update file.

10. The method of claim 9, wherein the one or more first network characteristics comprise one or more of latency, bandwidth, throughput, or network connection status.

11. The method of claim 9, wherein the communication network is a first communication network, and wherein the first update file is provided to the second multi-master replication system over a second communication network different from the first communication network.

12. The method of claim 9, wherein the multi-master replication mode further includes:
    generating an alert based on at least one of the one or more second network characteristics; and
    presenting the alert to a user of the system.

13. The method of claim 9, further comprising:
    determining a priority status of at least a portion of the first update of the first data object; and
    wherein the multi-master replication mode is triggered based on the priority status of the at least a portion of the first update of the first data object.

14. The method of claim 9, wherein the second update file includes the first update file batched with a previously scheduled replication of the third data object.

15. The method of claim 9, wherein the third and fourth data objects comprise immutable data objects and the first and second data objects comprise mutable data objects.

16. The method of claim 15, wherein the third and fourth data objects represent a geographic map, and the first and second data objects represent a point of interest of the geographic map.

17. A non-transitory computer readable medium comprising instructions that, when executed, cause one or more processors to perform:
    storing a first data object, the first data object being associated with a corresponding second data object stored by a remote master replication system;
    detecting one or more first network characteristics of a communication network;
    triggering a single-master replication mode based on the one or more first network characteristics of the communication network;
    detecting one or more second network characteristics of the communication network; and
    triggering a multi-master replication mode based on the one or more second network characteristics, the multi-master replication mode including:
        receiving a first update of the first data object;
        generating a first update file, the first update file indicating the first update of the first data object;
        providing the first update file to a first multi-master replication system over the communication network, the first multi-master replication system facilitating a delayed synchronization of the first data object and the second data object using the first update file;
        obtaining, by the first multi-master replication system, a third data object, wherein the third data object is associated with a corresponding fourth data object stored by a second multi-master replication system;
        generating, by the first multi-master replication system, a second update file indicating the first update of the first data object and the third data object;
        providing, by the first multi-master replication system, the second update file to the second multi-master replication system;
        synchronizing, by the second multi-master replication system, the third data object and the fourth data object using the second update file;
        generating, by the second multi-master replication system, a third update file, the third update file indicating the first update of the first data object;
        providing, by the second remote multi-master replication system, the third update file to the remote master replication system; and
        updating, by the remote master replication system, the second data object using the third update file.

* * * * *